2,893,415
Patented July 7, 1959

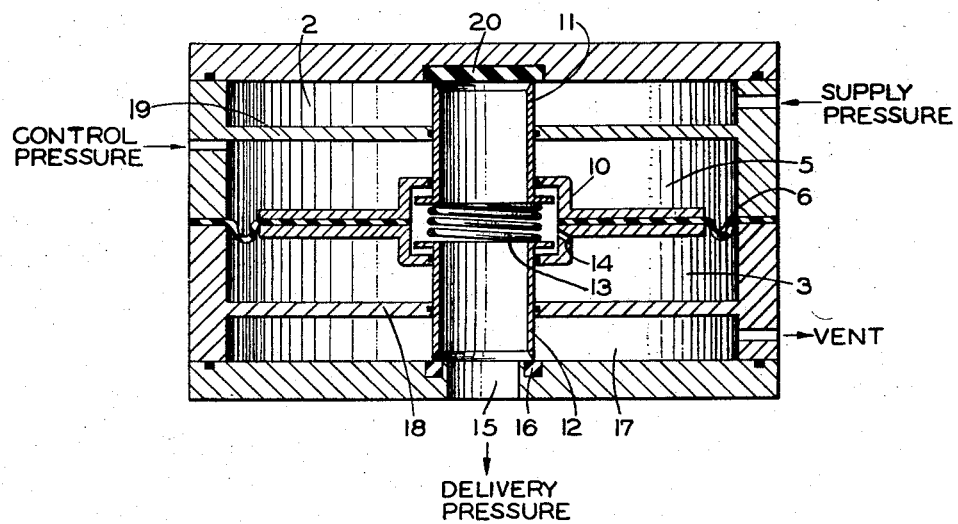

2,893,415

SELF-LAPPING RELAY VALVE DEVICE

Karl-Heinz Arenhold, Heidenheim (Brenz), and Walter Ortmann, Hannover, Germany, assignors to Westinghouse-Bremsen-Gesellschaft m.b.H., Hannover, Germany Application February 15, 1957, Serial No. 640,500

Claims priority, application Germany April 13, 1956

8 Claims. (Cl. 137—116.5)

This invention relates to self-lapping relay valve devices and more particularly to those of the pressure-balanced type.

In the railway brake field, it has heretofore been proposed to provide a poppet-type disc-shaped supply valve which is normally seated by auxiliary reservoir pressure and a light bias spring against a valve seat rib encircling an opening through a casing partition separating a supply chamber, open to the usual auxiliary reservoir, from a delivery chamber that is open to the brake cylinder and is located at one side of a diaphragm that is subject at its opposite side to fluid pressure in a control chamber, open to such as a straight-air pipe. The diaphragm carries a tube-like exhaust valve member which is sealingly slidable within an opening through a casing partition separating the control chamber from atmosphere.

When the control chamber is vented, the resiliency of the diaphragm will cause the tube-like exhaust valve member to be spaced from the disc-shaped supply valve for opening the brake cylinder to atmosphere. When the control chamber is initially charged, control chamber pressure will deflect the diaphragm for causing the tube-like exhaust valve member to successively sealingly engage and then unseat the disc-shaped supply valve against full auxiliary reservoir pressure and the bias spring pressure, for successively sealing off the brake cylinder chamber from atmosphere and then supplying fluid under pressure from the auxiliary reservoir to the brake cylinder until brake cylinder pressure substantially equals the control chamber pressure; whereupon the diaphragm will be deflected sufficiently to permit the supply valve to be reseated, while maintaining the tube-like exhaust valve member in sealing contact with the supply valve, such that fluid in the brake cylinder is bottled up at a pressure corresponding to the control chamber pressure.

With a valve device of the type just described, in order to effect an increase in brake cylinder pressure, it is necessary to increase control chamber pressure sufficiently to overcome a non-constant bias force corresponding to the value of existing auxiliary reservoir pressure acting over the effective area of the supply valve. Thus, this bias force is greatest when, with the brake cylinder vented and auxiliary reservoir fully charged, the control chamber is initially charged for effecting the brake application; and this bias force is somewhat less if control chamber pressure is increased to effect an increased brake application on top of an existing brake application, because said bias force will then correspond to the value of a lesser auxiliary reservoir pressure acting over the effective area of the supply valve. Moreover, after the supply valve is unseated, the bias force will be immediately reduced a degree corresponding to the value of reduced auxiliary reservoir pressure acting over the difference in effective areas of the aforementioned valve seat rib and tube-like exhaust valve member. It will thus be seen that with such a valve device it is impossible to obtain an accurate and sensitive control of brake cylinder pressure, according to the value of control chamber pressure.

The principal object of this invention is therefore to provide a pressure-balanced self-lapping relay valve device which assures accurate and sensitive control of pressure in a fluid pressure controlled device, such as a brake cylinder, according to variations in value of an operator-controlled pressure.

Another object is to provide a pressure-balanced self-lapping relay valve device which permits pressure in a fluid pressure controlled device to be increased in successive small increments, according to correspondingly small increments of increase in control pressure.

Other objects and advantages will become more apparent from the following more detailed description of the invention and from the accompanying drawing, wherein the single figure is a diagrammatic view of a pressure-balanced self-lapping relay valve device embodying the invention.

Description

As shown in the drawing, the pressure-balanced self-lapping relay valve device embodying the invention comprises an annular movable abutment, preferably of the type comprising an annular flexible diaphragm 6 suitably clamped about its outer edge between sections of a sectionalized casing and about its inner edge between parts of a coaxially arranged annular diaphragm follower assemblage in the form of a hollow cage 10. This cage comprises symmetrical annular portions that extend in opposite axial directions in encirclement of the central opening through the diaphragm and have inwardly directed annular flanges that overlie outwardly directed annular flanges formed at the adjacent ends of two coaxially arranged, axially movable tubular valve members 11 and 12 having the same inside and outside diameters. The valve members 11 and 12 have sealing, slidably guided contact with the walls of the respective bores defined by the corresponding axially spaced inwardly directed annular flanges of the cage 10; but the outwardly directed annular flanges of said valve members do not under any condition have sealing contact with said inwardly directed flanges of the cage.

Valve member 11, intermediate its ends, has sealing, slidably guided contact with the wall of an aligned bore through a casing partition 19 separating a control chamber 5 at one side of diaphragm 6 from a supply chamber 2 that is open to a source of fluid under pressure, such as an auxiliary reservoir (not shown). Valve member 12 has sealing, slidably guided contact, intermediate its ends, with the wall of an aligned bore through a casing partition 18 separating an atmospheric chamber 17 from a delivery chamber 3 disposed at the opposite side of diaphragm 6.

A relatively light helical spring 13 contained in cage 10 is interposed between, and bears on, the aforementioned outwardly directed annular flanges of the valve members 11 and 12 for biasing said valve members into seating contact with resilient vave seats 20 and 16, respectively. The valve seat 20 is mounted in the end wall of chamber 2. The valve seat 16, which is annular in form, is disposed in the end wall of atmospheric chamber 17 in encirclement of a delivery port 15 leading to the device, such as a brake cylinder, in which fluid pressure is to be controlled; said delivery port being constantly open to the delivery chamber 3 via the central openings or bores in the tubular valve members 11 and 12 and a baffle port 14 provided in the cage 10.

Operation

Assume initially that control chamber 5 is devoid of fluid under pressure. Under this condition, the spring 13 will be effective to seat valve member 11 against valve seat 20 for preventing flow of fluid under pressure from supply chamber 2 to the delivery port 15 and delivery chamber 3; and said spring 13 will also be effective to seat valve member 12 against the annular valve seat 16 for preventing release of fluid under pressure from the port 15 and the delivery chamber 3 to atmospheric chamber 17, thereby defining a lap position of the valve device.

To provide fluid at a desired pressure in the delivery port 15, fluid is supplied to the control chamber 5 at such desired pressure for causing diaphragm 6 to deflect downwardly and, through engagement of the overlying flange of cage 10 with the outwardly directed annular flange of valve member 11, unseat said valve member from its valve seat 20; whereupon fluid under pressure will flow via supply chamber 2 and past unseated valve member 11 and through the central openings in the valve members 11 and 12 to the delivery port 15 and also via baffle port 14 to the delivery chamber 3. Meanwhile, valve member 12 will be maintained seated by pressure of spring 13. When pressure in the delivery port 15, and hence in delivery chamber 3, increases to a value corresponding to the pressure provided in control chamber 5, the diaphragm 6 and hence cage 10 will be shifted upwardly, for thereby permitting spring 13 to seat valve member 11 for terminating flow from said supply chamber 2 to the delivery port 15 and delivery chamber 3 and thus causing the valve device to assume its previously defined lap position, in which fluid will be bottled up in said delivery port and in the delivery chamber at the pressure corresponding to the desired pressure provided in control chamber 5.

To effect a release of fluid pressure from the delivery port 15, pressure of fluid in control chamber 5 is reduced; whereupon diaphragm 6 and hence cage 10 will be shifted upwardly by preponderant pressure of fluid in delivery chamber 3 for causing valve member 12 to be unseated through engagement of the overlying flange of cage 10 with the outwardly directed flange of said valve member. With valve member 12 unseated, fluid under pressure will be released from delivery port 15 past said unseated valve member to atmospheric chamber 17. Meanwhile, valve member 11 will be maintained seated by pressure of spring 13. The valve device will reassume its previously defined lap position when pressure in the delivery port 15 and hence in chamber 3 is reduced to the value of control pressure in chamber 5.

It will thus be noted that the fluid pressure forces on the valve members 11 and 12 are always balanced because the circular bores or openings in said valve members, and the interior of the cage 10, and even both sides of the outwardly directed annular flanges on said valve members are always subjected to the same fluid pressure; namely, the pressure of fluid in the delivery port 15. Since the flanges on the cage 10 sealingly engage the outer tubular wall of the valve members 11 and 12 but do not sealingly engage the flanges on said valve members (even when one of said valve members is selectively unseated), the relay valve device is truly fluid pressure balanced. But even if, while one or the other of the valve members 11 or 12 is unseated by engagement of its outwardly directed flange with the corresponding inwardly directed flange of the cage 10, fluid pressure should not be freely effective against the "engaging face" of said outwardly directed flange. It will be noted that when the opposing fluid pressure forces acting on the diaphragm 6 are substantially balanced, the valve device will assume its lap position, in which it is shown, and in which both valve members 11 and 12 are seated and there is slight axial clearance between their respective "engaging faces" and the corresponding inwardly directed flanges of the cage 10, thereby assuring that fluid pressure will be equally effective on both sides of the valve member flanges; such slight axial clearance providing, in effect, a lost motion connection between the cage 10 and each of the valve members 11 and 12. Hence, upon a slight increase or decrease in fluid pressure in the control chamber 5 relative to that in the delivery port 15 and delivery chamber 3, the diaphragm 6 will promptly deflect, move through the aforementioned slight axial distance and then cause unseating of valve member 11 or 12, respectively.

It will thus be seen that the improved pressure balanced self-lapping relay valve device will provide very accurate and sensitive control of fluid pressure in the delivery port 15 and hence in a fluid pressure controlled device (not shown) connectable to said port.

Having now described the invention, what we claim as new and desire to secure by Letters Patent is:

1. A pressure balanced self-lapping relay valve device comprising casing means providing a supply port charged with fluid under pressure, a control port chargeable with fluid at a selectable pressure, a delivery port and a vent port, annular movable abutment means operably mounted in said casing means and subject opposingly to pressures of fluid in said control port and delivery port, two coaxially arranged tubular valve members having aligned bores of equal diameter constantly open to the delivery port and projecting in opposite axial directions from said movable abutment means, each of said valve members being alternatively movable relative to or by said movable abutment means according to direction of axial movement of said movable abutment means, and a spring interposed between and acting on said valve members for biasing them in opposite directions to respective seated positions, one of said valve members controlling connection of the delivery port with the supply port, and the other of said valve members controlling connection of the delivery port with the vent port, said annular movable abutment means sealingly encircling said valve members and being operative responsively to an increase or decrease in pressure in the control port to operatively unseat said one valve member or said other valve member respectively while permitting the valve member not so unseated to be maintained seated by said spring.

2. A pressure balanced self-lapping relay valve device comprising casing means providing a supply port charged with fluid under pressure, a control port chargeable with fluid at a selectable pressure, a delivery port and a vent port, annular movable abutment means operably mounted in said casing means and subject opposingly to pressures of fluid in said control port and delivery port, two identical coaxially arranged tubular valve members having at their adjacent ends projections which extend radially outward and are disposed between axially spaced inwardly directed annular portions surrounding the central opening through the annular movable abutment means, the tubular walls of the respective valve members being sealingly engaged by a corresponding one of said inwardly directed annular portions, and spring means for urging the valve members in opposite axial directions to respective seated positions, one of said valve members controlling connection of the delivery port with the supply port, and the other of said valve members controlling connection of the delivery port with the vent port, said annular movable abutment means being operative responsively to an increase or decrease in pressure in the control port to operatively unseat said one valve member or said other valve member respectively through engagement of the corresponding annular portion with the projection on the valve member to be unseated until pressure in the delivery port balances with the pressure in the control port and meanwhile permitting the valve member not so unseated to be maintained seated by said spring means.

3. A pressure balanced self-lapping relay valve device comprising casing means defining a supply chamber charged with fluid under pressure from a source, a control chamber chargeable with fluid at a selectable pressure, a delivery chamber, and a vent chamber, two coaxially arranged tubular valve members having aligned bores of equal diameters, said delivery chamber being constantly open to said aligned bores, annular movable abutment means subject opposingly to fluid pressures in said control chamber and delivery chamber and sealingly encircling said valve members, means providing a lost motion connection between said movable abutment means and each of said valve members for permitting axial movement of said valve members alternatively relative to or by said movable abutment means responsive to movement of said movable abutment means in one direction or the opposite direction from a normal position, and means for normally biasing said valve members to respective seated positions for closing off the delivery chamber from both the supply chamber and vent chamber, said movable abutment means being operative out of normal position in said one direction to a supply position or in said opposite direction to a release position responsively to an increase or decrease in control chamber pressure relative to delivery chamber pressure, respectively, for selectively unseating one or the other of said valve members through the medium of the lost motion connection for thereby connecting said delivery chamber to said supply chamber or said vent chamber, respectively, until pressure in said delivery chamber equalizes with pressure in the control chamber, said bias means being operable upon such unseating of either of said valve members to maintain the remaining valve member seated.

4. A pressure balanced self-lapping relay valve device comprising casing means partitioned into a supply chamber charged with fluid under pressure from a source, a control chamber chargeable with fluid at a selectable pressure, a delivery chamber and a vent chamber, two coaxially arranged tubular valve members having through bores of equal diameter, one of said valve members controlling fluid pressure communication between said delivery chamber and supply chamber, and the other of said valve members controlling fluid pressure communication between said delivery chamber and vent chamber, said delivery chamber being constantly open to said through bores of the tubular valve members and to a delivery port that is formed in the end wall of the vent chamber and is sealingly encircled by said other valve member when seated, annular movable abutment means operable in said casing means and subject opposingly to fluid pressures in said control chamber and delivery chamber, said annular movable abutment means having, in encirclement of the central opening therethrough, axially spaced inwardly directed annular flange-like portions sealingly engaging the outer tubular walls of the respective valve members and overlying radially outwardly directed projections formed on the adjacent ends of said valve members, said movable abutment means having a normal position in which it is ineffective to cause unseating of said valve members and operable in opposite directions from normal position to a supply position or to a release position for selectively unseating said one valve member or said other valve member through engagement of a corresponding one of said flange-like portions with a respective one of said projections, and a spring interposed between said valve members for seating both of said valve members when the movable abutment means is in normal position and maintaining either of said valve members seated upon unseating of the remaining valve member by said movable abutment means when in its supply position or release position.

5. A pressure balanced self-lapping relay valve device comprising a pair of coaxially arranged tubular valve members of equal inside and outside diameters, one of said valve members controlling connection of a supply chamber with a delivery chamber and being sealingly reciprocable within an opening through a casing partition separating said supply chamber from a control chamber chargeable with fluid at a selectable pressure, the other of said valve members controlling connection of said delivery chamber with a vent and being sealingly reciprocable within an aligned opening through another casing partition separating said delivery chamber from said vent, annular movable abutment means subject opposingly to fluid pressures in said control chamber and delivery chamber and having axially spaced inwardly directed annular flange-like portions for sealingly encircling the outer tubular walls of the valve members, said valve members having at their adjacent ends outwardly directed projections which are disposed between said axially spaced inwardly directed annular flange-like portions, said movable abutment means being operable responsively to a change in pressure in said control chamber relative to that in said delivery chamber to selectively unseat said one or said other valve member through engagement of a corresponding one of said inwardly directed flange-like portions with the outwardly directed projection on the valve member being unseated, and spring means interposed between and acting on said valve members for normally urging them in opposite directions and maintaining said valve members seated except when unseated by said movable abutment means.

6. A pressure balanced self-lapping relay valve device comprising casing means having a partition separating a supply chamber charged with fluid under pressure from a control chamber that is chargeable with fluid at a selectable pressure and another partition separating a delivery chamber from an atmospheric chamber, annular movable abutment means operably mounted in the casing means and subject opposingly to fluid pressures in the control chamber and delivery chamber, a pair of coaxially arranged tubular valve members of equal inside and outside diameters axially movable within and in sealing contact with portions of the wall of the central opening through the annular movable abutment means and extending in opposite axial directions from said movable abutment means and projecting in sealing slidable contact with the walls of aligned bores through a respective one of said partitions, one of said valve members controlling connection of the delivery chamber with the supply chamber, and the other of said valve members controlling connection of said delivery chamber with the atmospheric chamber, said delivery chamber being constantly open to said central opening and to the through axial openings in said tubular valve members, and spring means interposed between and acting on said valve members for urging the valve members to respective seated positions for closing said connections, said valve members having radially outward extending portions disposed within said central opening for selective engagement by said movable abutment means upon axial movement thereof, such that said movable abutment means will effect selective unseating of said one valve member or said other valve member according as said movable abutment means is shifted in one axial direction or in the opposite direction responsively to an increase or decrease in control chamber pressure relative to delivery chamber pressure, respectively.

7. A pressure balanced self-lapping relay valve device comprising casing means having a partition separating a supply chamber charged with fluid under pressure from a source from a control chamber chargeable with fluid at a selectable pressure less than the pressure in the source, and having another partition separating a delivery chamber from a vent chamber, two coaxially arranged tubular valve members having aligned bores of equal diameter and each intermediate its ends having sealing slidable contact with the wall of an aligned opening through a corresponding one of said partitions, a valve seat provided in the end wall of the supply chamber and normally engaged by one of said valve members, an annular valve seat normally engaged by the other of said valve members and provided in the end wall of the vent chamber in encirclement of a delivery port that is constantly open to the delivery chamber, a movable abutment subject to opposing fluid pressures in said control chamber and delivery chamber and sealingly encircling said valve members, means providing a lost motion connection between said movable abutment and valve members for causing one or the other of said valve members to be selectively unseated for supplying fluid under pressure to or releasing fluid under pressure from said delivery port, respectively, upon axial movement of the movable abutment responsively to an increase or decrease, respectively, in pressure in said control chamber.

8. A pressure balanced self-lapping relay valve device comprising an annular movable abutment subject to opposing fluid pressures in a control chamber and a delivery chamber, two identical coaxially arranged tubular valve members having through bores open to the delivery chamber and to the central opening in the annular movable abutment, said valve members projecting in opposite directions from the movable abutment and being sealingly slidable relative to said movable abutment, a spring interposed between said valve members for normally biasing them to respective seated positions for closing off the said through bores and delivery chamber from a supply chamber and from a vent, means providing an operating connection between each of the valve members and the movable abutment, said movable abutment being operative responsively to an increase or decrease in pressure in the control chamber to effect unseating of one or the other of said valve members through the corresponding operating connection for opening said delivery chamber to said supply chamber or said vent, respectively, while permitting the valve member not so unseated to be maintained seated by the spring.

References Cited in the file of this patent

UNITED STATES PATENTS

| | | |
|---|---|---|
| 2,252,418 | Shelley | Aug. 12, 1941 |
| 2,270,549 | Orr | Jan. 20, 1942 |
| 2,582,612 | Williams | Jan. 15, 1952 |

FOREIGN PATENTS

| | | |
|---|---|---|
| 154,610 | Australia | Jan. 4, 1954 |